Oct. 11, 1938.   A. M. WOLF   2,132,450
MOTOR VEHICLE
Original Filed April 7, 1932   11 Sheets-Sheet 3

INVENTOR
Austin M. Wolf

Oct. 11, 1938.  A. M. WOLF  2,132,450
MOTOR VEHICLE
Original Filed April 7, 1932   11 Sheets-Sheet 4
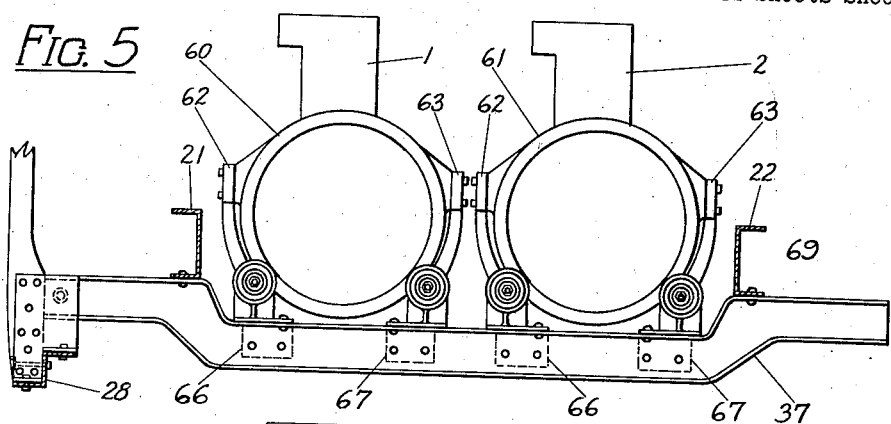
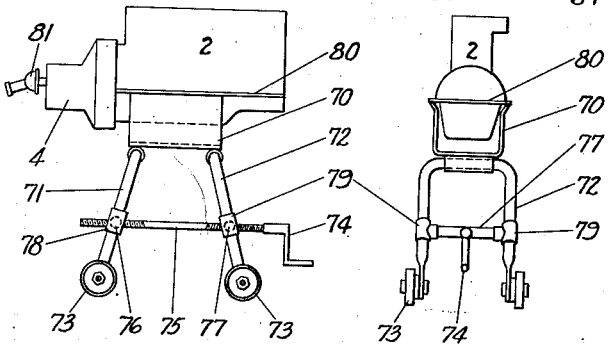
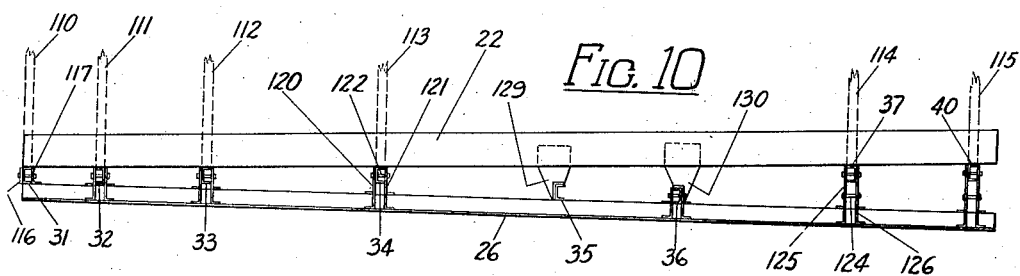
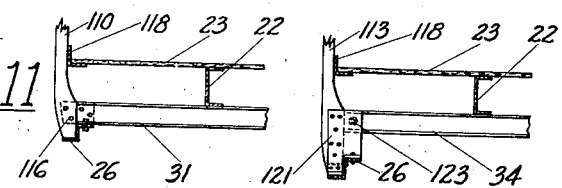
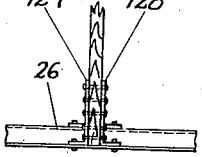
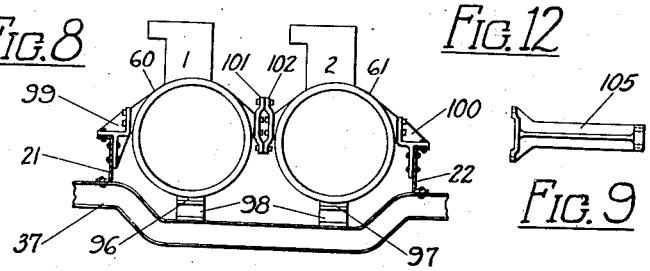
INVENTOR

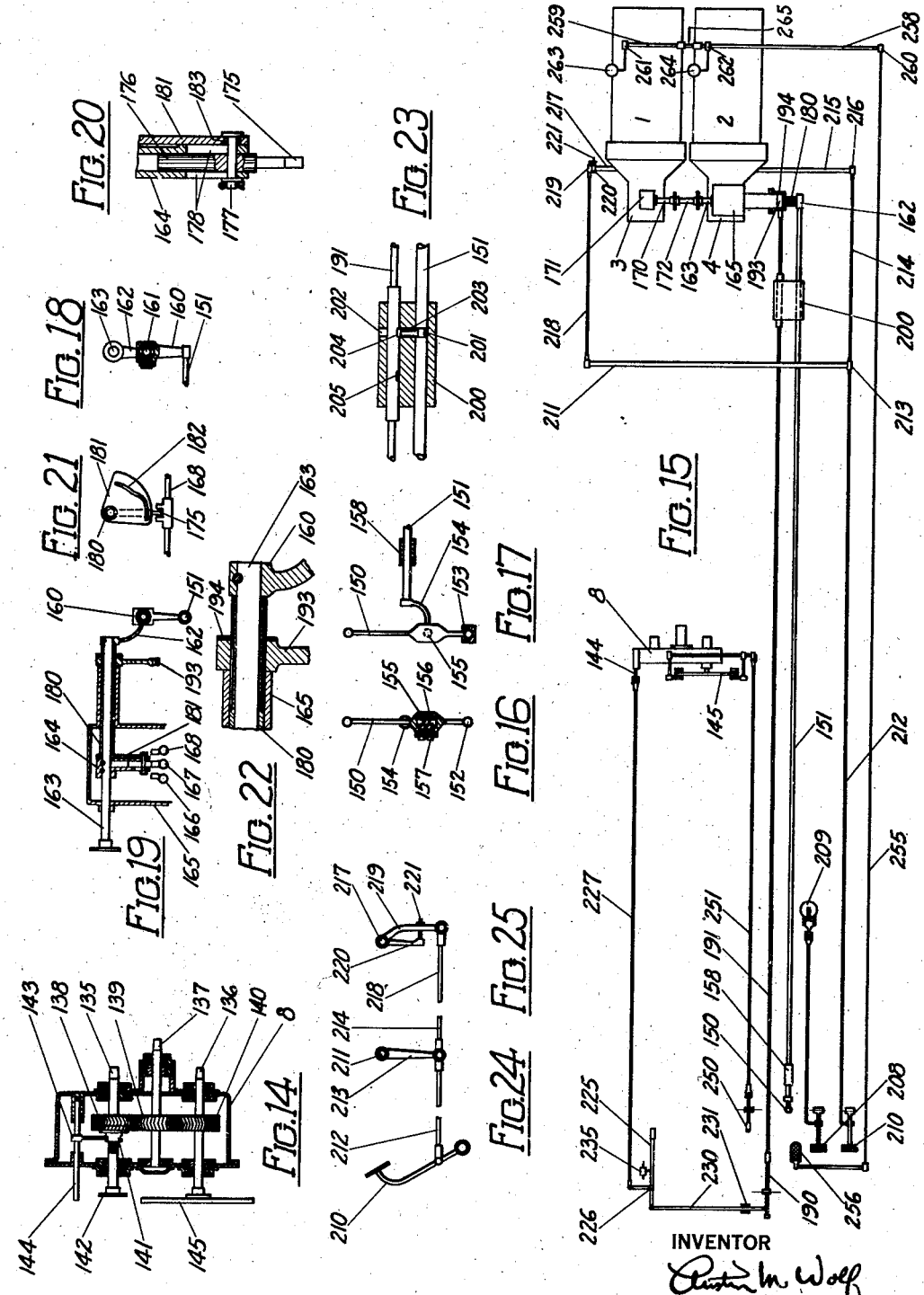

Oct. 11, 1938.  A. M. WOLF  2,132,450
MOTOR VEHICLE
Original Filed April 7, 1932   11 Sheets-Sheet 6
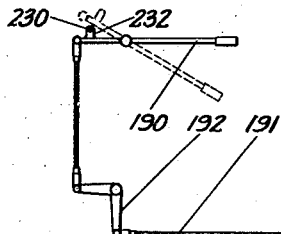
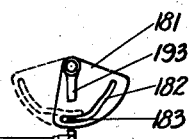
Fig. 26
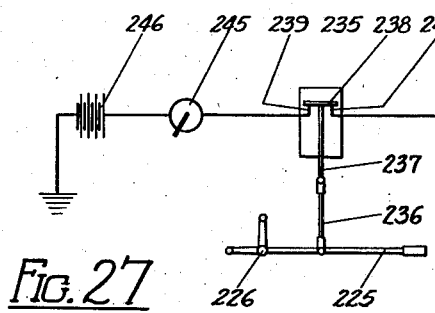
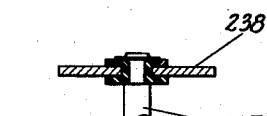
Fig. 27  Fig. 28
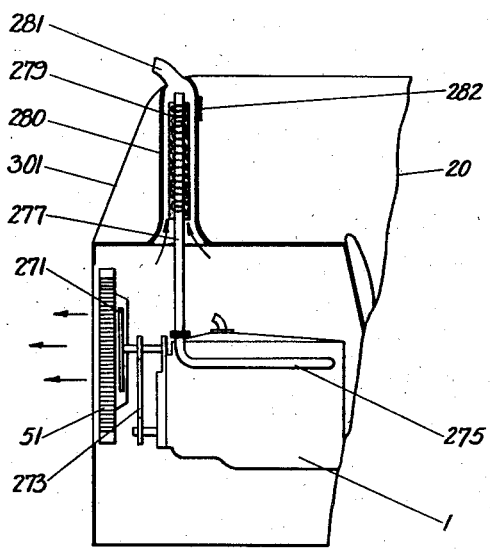
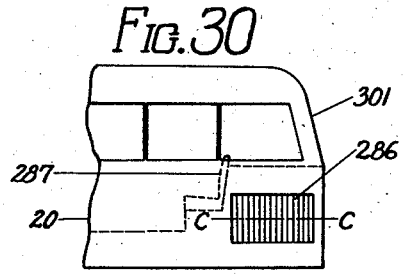
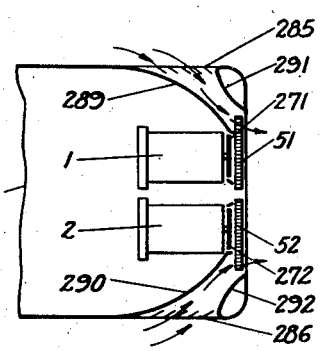
Fig. 29  Fig. 31
INVENTOR
Austin M. Wolf

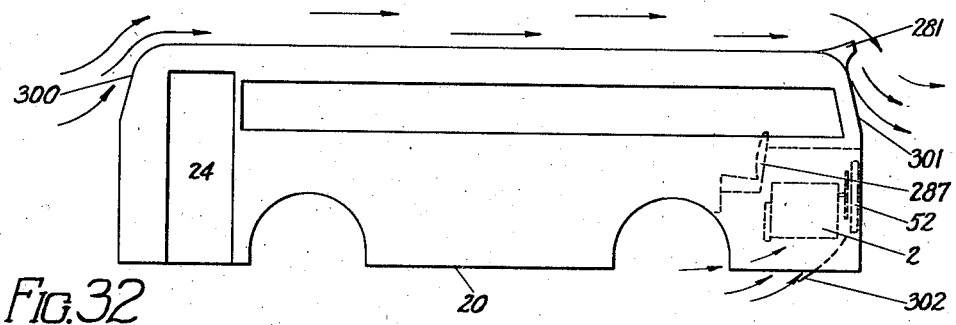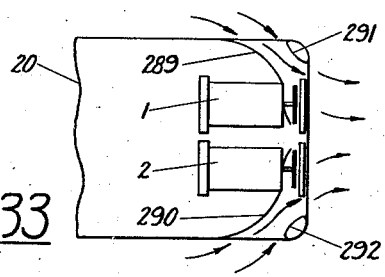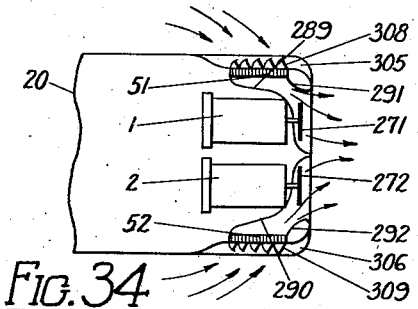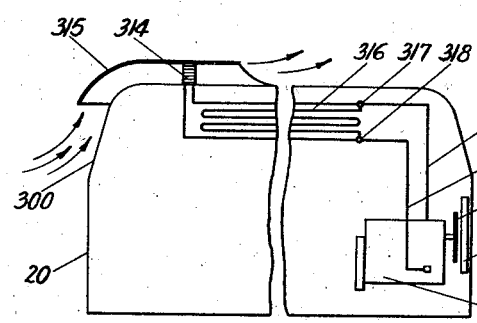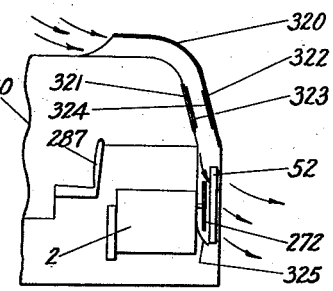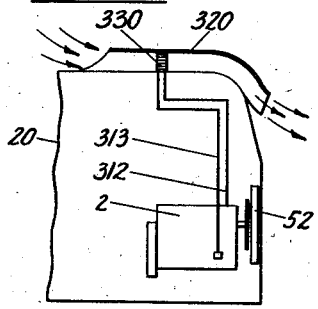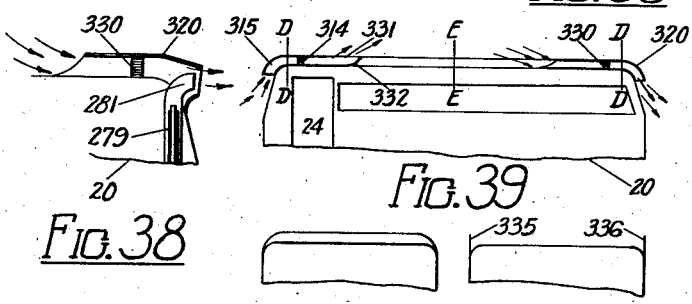

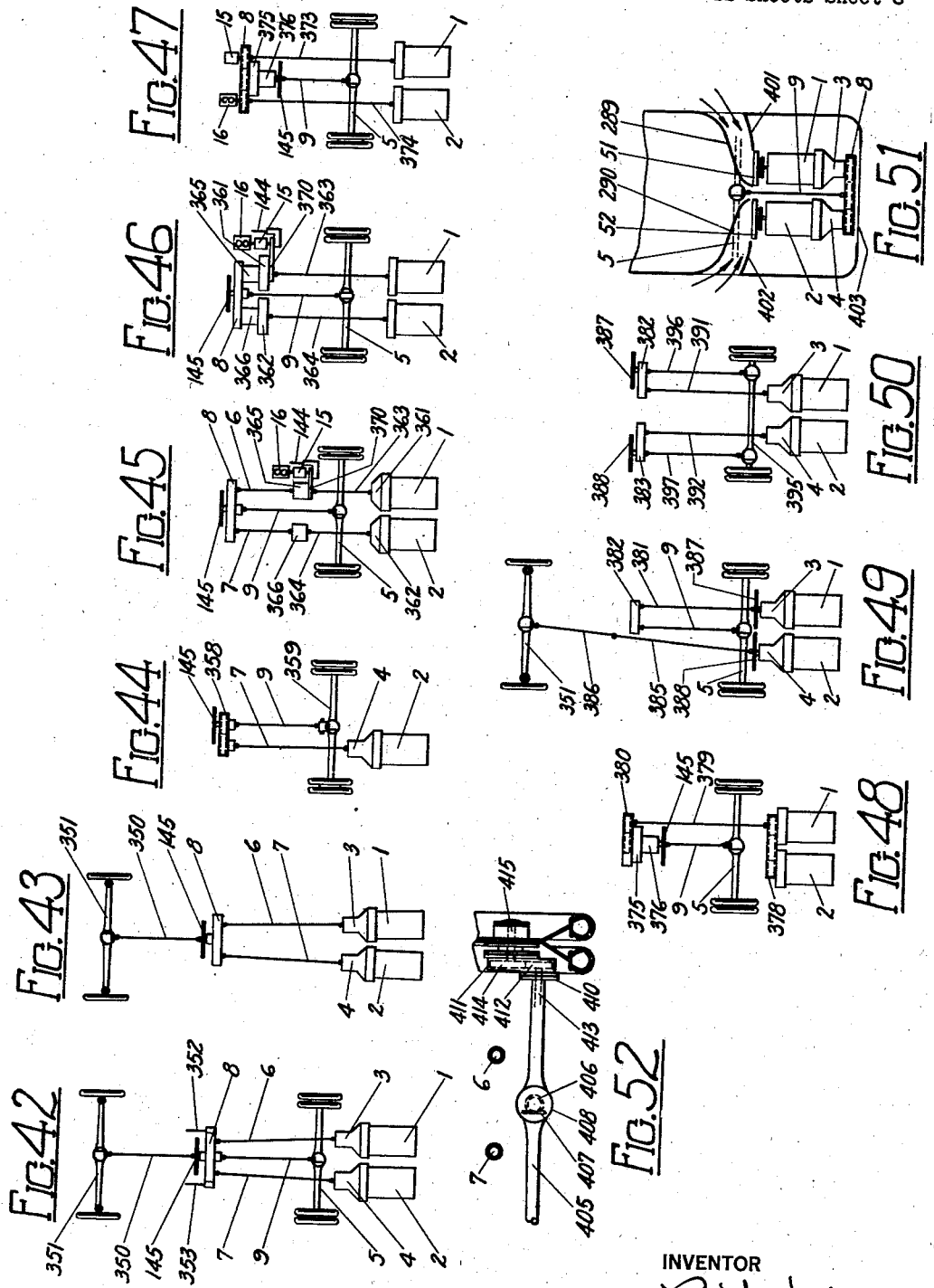

Oct. 11, 1938.  A. M. WOLF  2,132,450
MOTOR VEHICLE
Original Filed April 7, 1932   11 Sheets-Sheet 9
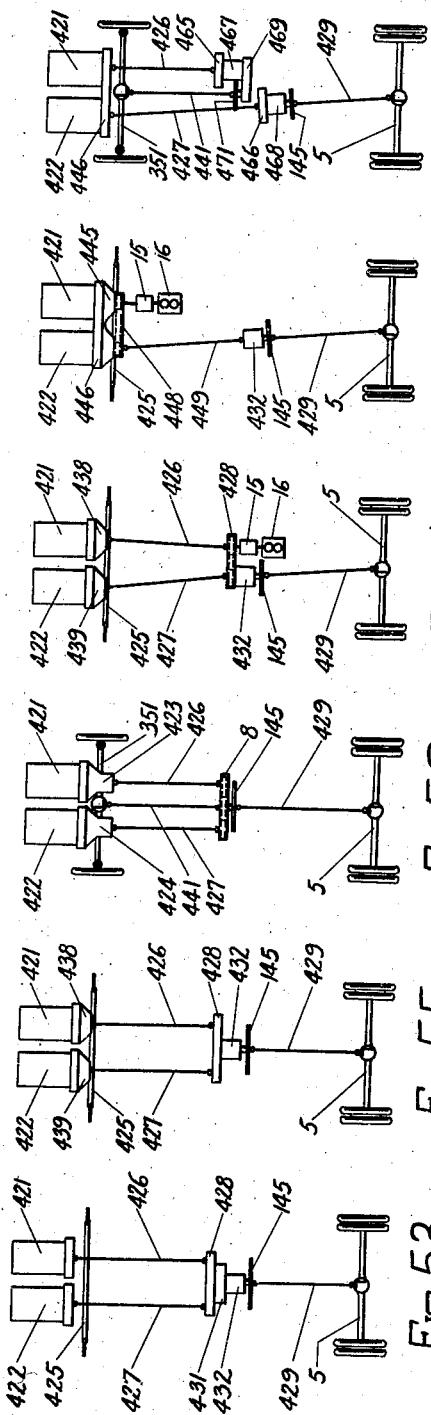
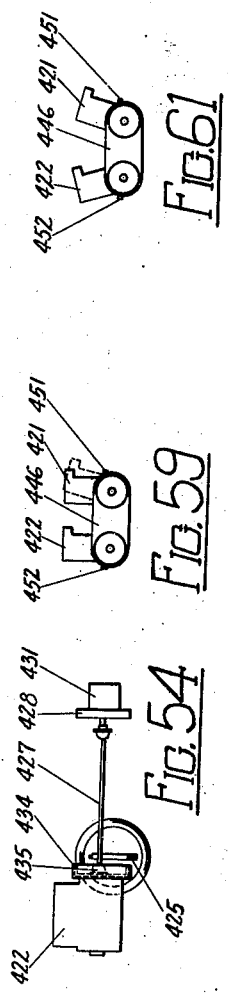
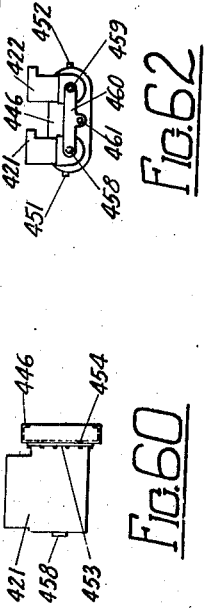
INVENTOR Oct. 11, 1938.  A. M. WOLF  2,132,450
MOTOR VEHICLE
Original Filed April 7, 1932    11 Sheets-Sheet 10
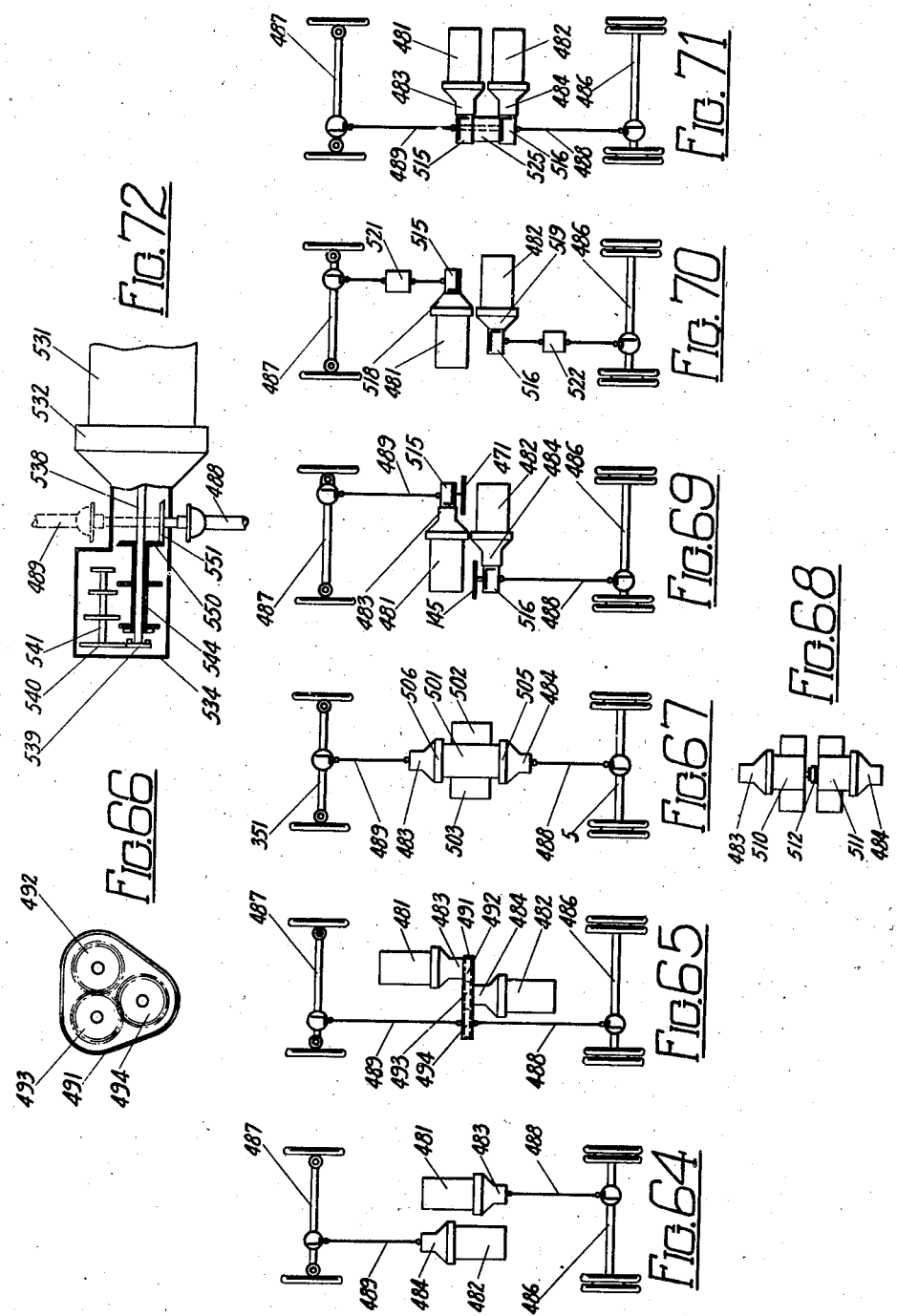
INVENTOR
Austin M. Wolf Oct. 11, 1938.   A. M. WOLF   2,132,450
MOTOR VEHICLE
Original Filed April 7, 1932   11 Sheets-Sheet 11
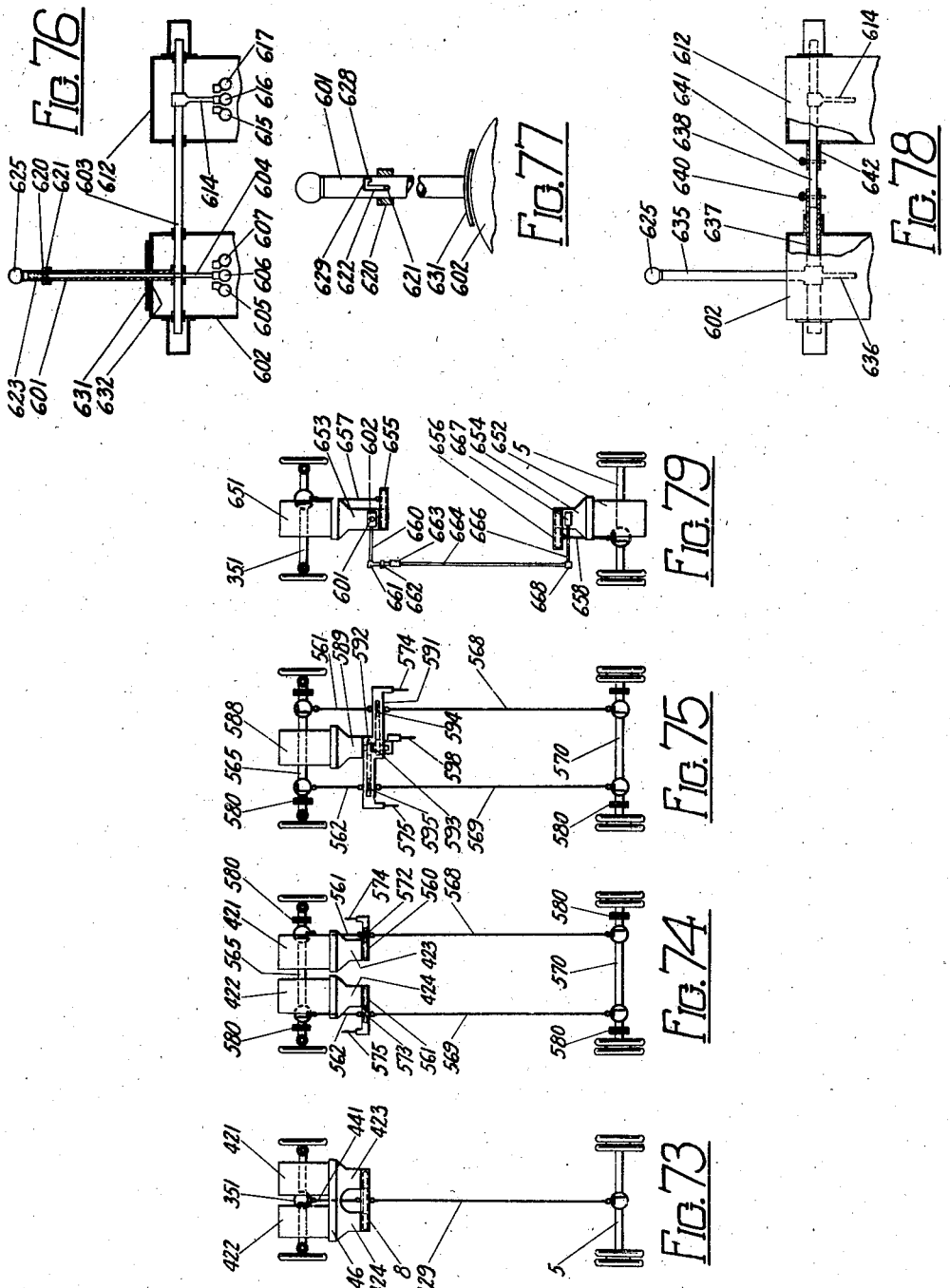
INVENTOR
Austin M. Wolf Patented Oct. 11, 1938

2,132,450

UNITED STATES PATENT OFFICE 2,132,450

MOTOR VEHICLE

Austin M. Wolf, Plainfield, N. J.

Application April 7, 1932, Serial No. 603,701
Renewed June 25, 1937

27 Claims. (Cl. 180—54)

This invention relates to motor vehicles, particularly for the carrying of passengers. There has been a steady increase in the power of engines used for this service in order to impart accelerating and speed possibilities of busses similar to that of passenger cars. Twelve cylinder engines are now being used for this service, resulting in a power plant that is very hard to remove and handle on the maintenance end. Furthermore, the abnormally large engine is a very inefficient prime mover when the bus is only lightly loaded. Furthermore, these large engines, due to their small production, are very costly.

The primary object of this invention is to provide a plurality of power plants, each one being easily removed and obtainable in the market at a low cost.

A further object is in the use of all the power plants for maximum duty and to be able to run on one power plant when the service is light as between rush hours. It is also possible to run the vehicle with one engine and with the other power plant entirely removed from the vehicle.

A further object of the invention is to provide means for driving the necessary accessories such as the generator and air compressor by other mechanism than that directly on the engine. The relatively small individual engines that I utilize are built only for small capacity accessories, and it would entail considerable cost to change over a standard engine so as to provide a special driving mechanism. In placing the accessories in the power transmission line between the engine and the driving axle, these accessories are relieved of engine accelerations, such as occur while speeding up through the lower gears. In rotating in proportion to the rear wheel revolutions, the accessories are relieved of such damaging conditions.

A further object of the invention is in the ability to drive the above mentioned accessories through the power transmitting mechanism without having to put the vehicle into motion.

A further object of the invention is in the provision of driving the above mentioned accessories by one engine and providing an interlock on the gear box control, making the gear box of the other engine inoperative when the accessories are driven and the vehicle is not in motion. It is also possible to prevent operation of the second engine while the first one is driving the accessories.

A further object of the invention is to provide a control mechanism for the gear boxes so that when driving with one engine, the other gear box is inoperative. This control comprises an interlocking mechanism so that the one gear box cannot be made inoperative, or brought back into action, without the shifting mechanism of the other gear box being in the neutral position.

A further object of the invention is to provide for the use of a standard driving axle without the need of resorting to a special construction of this unit.

A further object of the invention is to provide a frame construction, eliminating the customary ramp that is incorporated in the flooring in order to provide clearance over the driving axle housing. Many vehicles are produced with a low frame height which gives a low door opening, but in order to provide for driving axle clearance the floor does not follow the top of the frame but slopes up toward the driving axle. The frame and body in my construction are of the unit type and the center frame members are inclined downward toward the front while the outside frame members are horizontal and support the body posts and sheathing.

A further object of the invention is to provide a cooling system at the rear of the vehicle, in which ample air circulation is established to carry away the heat from the radiator cores.

A further object of the invention is to provide a rear exhaust system which is discharged at the roof level in order to provide thorough diffusion of the exhaust gases with the surrounding atmosphere. This exhaust system is also used for ventilation purposes.

I have shown my invention incorporated in a "trolley" type bus. This type of vehicle is most admirably adapted for transportation in dense centers. In order that no obstruction be located in the loading space, the power plant should be in the extreme rear. Any possibility of noise, smell or heat is confined to that portion of the vehicle where there are not passengers and therefore any harmful results therefrom would be exceedingly remote.

Still further objects of the invention will appear as a description thereof proceeds with reference to the accompanying drawings in which, Fig. 1 is a plan view of a bus chassis.

Fig. 5 is a transverse view on line B—B of Fig.

Figure 1:
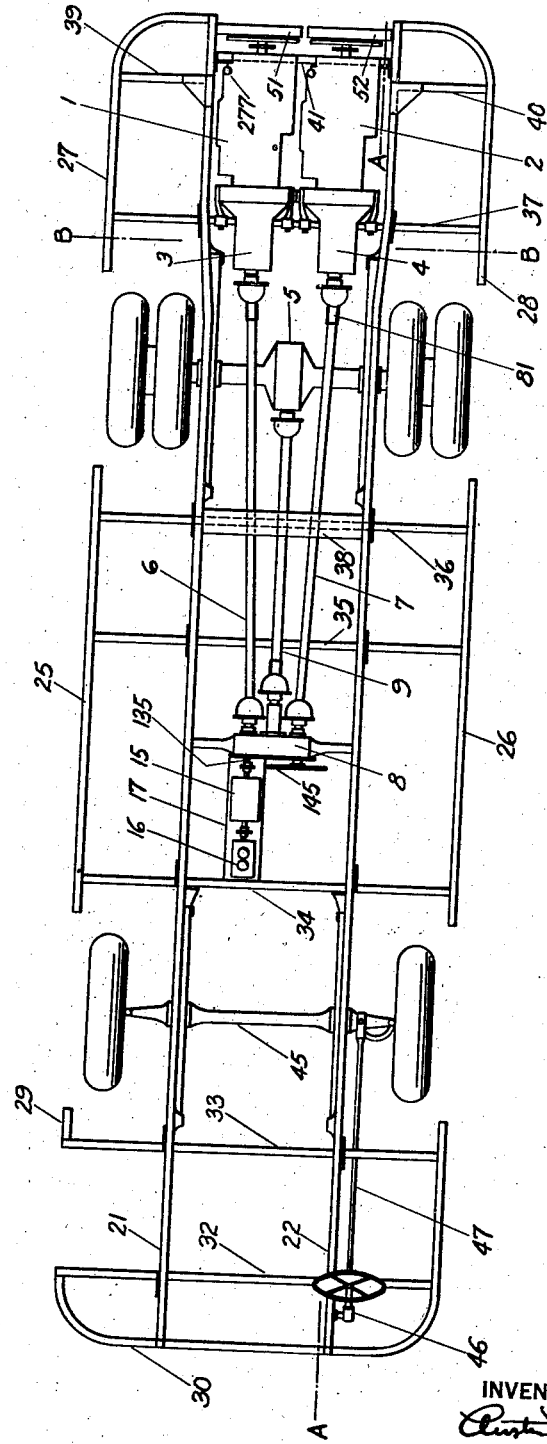

1, with the gear boxes removed from the engine.

Figs. 6 and 7 show a hand truck for removing the individual power plants.

Fig. 8 is a transverse view similar to Fig. 5, but with different engine mountings.

Fig. 9 shows a spacer member which is used when one of the engines is removed.

Figs. 10, 11, 12 and 13 show the frame construction incorporated in my invention.

Fig. 14 is a sectional view of the transfer case.

Fig. 15 is a layout of the control mechanism for the engines, clutches, gear boxes, brakes and accessory drive.

Figs. 16, 17, 18, 19, 20, 21, 22, 23, 24, 25 and 26 are details of the general mechanism shown in Fig. 15.

Figs. 27 and 28 show a control mechanism, making one engine inoperative while the other engine drives the accessories.

Fig. 29 shows the exhaust system with roof-level discharge.

Figs. 30 and 31 indicate a cooling air flow from a side of the vehicle.

Fig. 32 indicates the streamline air flow around the vehicle, whereby the vacuum at the rear of the vehicle is concentrated over the area of the radiators.

Figs. 33, 34, 35, 36, 37, 38, 39, 40 and 41 show various means of utilizing the air currents for the cooling system.

Figs. 42, 43, 44, 45, 46, 47, 48, 49, 50 and 51 show various rear-located engine arrangements.

Fig. 52 indicates an axle construction in which the center portion is at a lower height than is customary.

Figs. 53, 54, 55, 56, 57, 58, 59, 60, 61, 62 and 63 show various front-located engines utilizing the same principles of my invention. Figs. 59, 60, 61, 62 and 63 show details of the engines themselves.

Figs. 64, 65, 66, 67, 68, 69, 70, 71 and 72 show various centrally mounted engine combinations.

Figs. 73, 74 and 75 show various combinations incorporating a four-wheel drive.

Figs. 76, 77, 78 and 79 show a control mechanism in which the gear shifting lever is mounted directly over one gear box.

Like reference characters indicate like parts throughout the several views.

The engines 1 and 2 together with the gear boxes 3 and 4 are located to the rear of the driving axle 5. Propeller shafts 6 and 7 convey the drive to the transfer case 8. I prefer to place the slip joint at the rear of the gear box and place the fixed joint adjacent the transfer case 8. This arrangement is shown in Fig. 1. Power is then transmitted through the single propeller shaft 9 to the driving axle 5. The propeller shafts are provided with the customary universal joints.

The generator 15 and compressor 16 are driven by an extension shaft from the transfer case 8 as will be explained later. These accessories are mounted on the base plate 17 which extends from the transfer case 8 to the frame cross member 34.

The frame or foundational structure consists of the central members 21 and 22. They slope from the rear down toward the front. The flooring 23 rests directly on top of these central members and its height over the driving axle 5 is such that there is sufficient clearance between the top of the axle housing and the bottom of the flooring, to provide for the necessary axle movement under spring action. At the front of the bus the frame is lower so that at the door opening 24 a single step 25 will suffice to gain entrance to the interior of the bus. This construction eliminates the customary ramp used by bus body builders and at the same time provides a low entrance.

The outside frame members consist of the rails 25, 26, 27, 28, 29 and 30. The gap between these members adjacent the wheels provides for the wheel house at each of these points and a curved member connects the outside rails at these points. Cross members 31, 32, 33, 34, 35, 36 and 37 run beneath the central frame members 21 and 22 and support the outside frame members at their extremities. A cross member 38 extends between the central members slightly ahead of the driving axle. At the rear of the vehicle outriggers 39 and 40 run from the central members to the outside members instead of extending all the way across. This is necessary in order to remove the power plant as will be explained later. A removable cross member 41 unites the central members at the rear.

Figure 2:
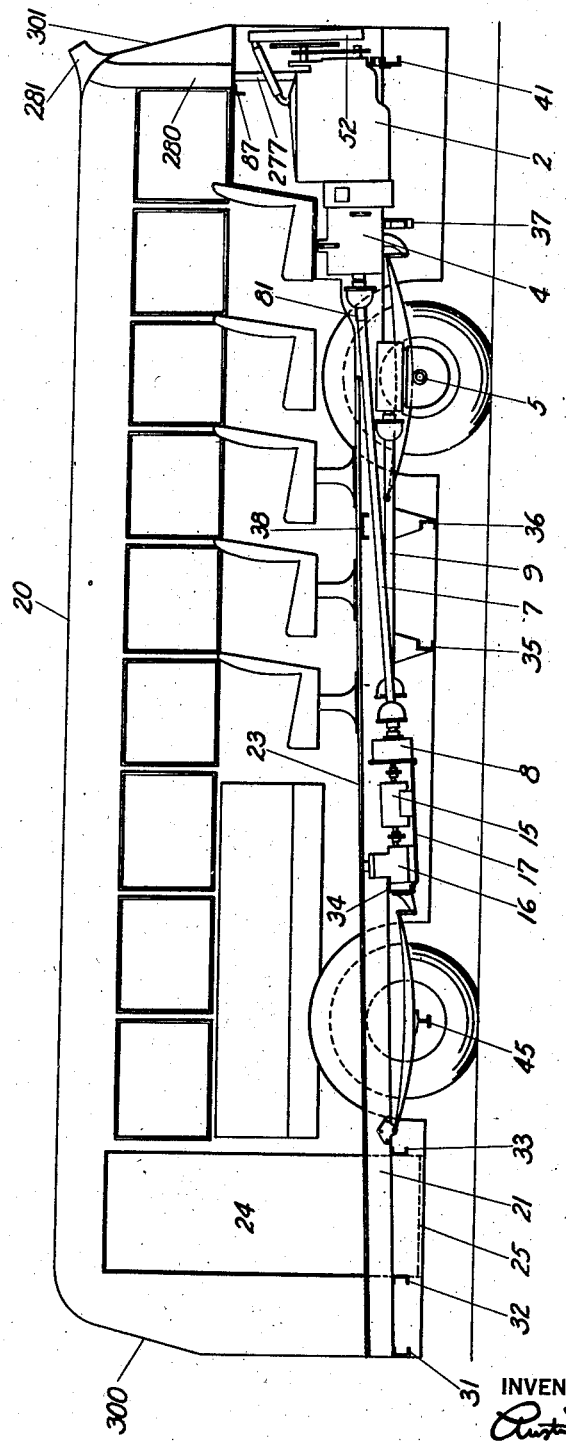
Fig. 2 is a sectional elevation view on line A—A of Fig. 1.

It will be noted from Fig. 2 that whereas the central frame members slope down from back to front, the body proper is horizontal. The bottom of the sheathing which is supported by the outside members runs parallel to the ground. The door opening 24 is perpendicular thereto.

The front axle 45 and the rear axle 5 are attached to the frame in the customary manner, semi-elliptic springs being shown. The steering gear 46 actuates the front axle through the drag-link 47.

Figure 3:
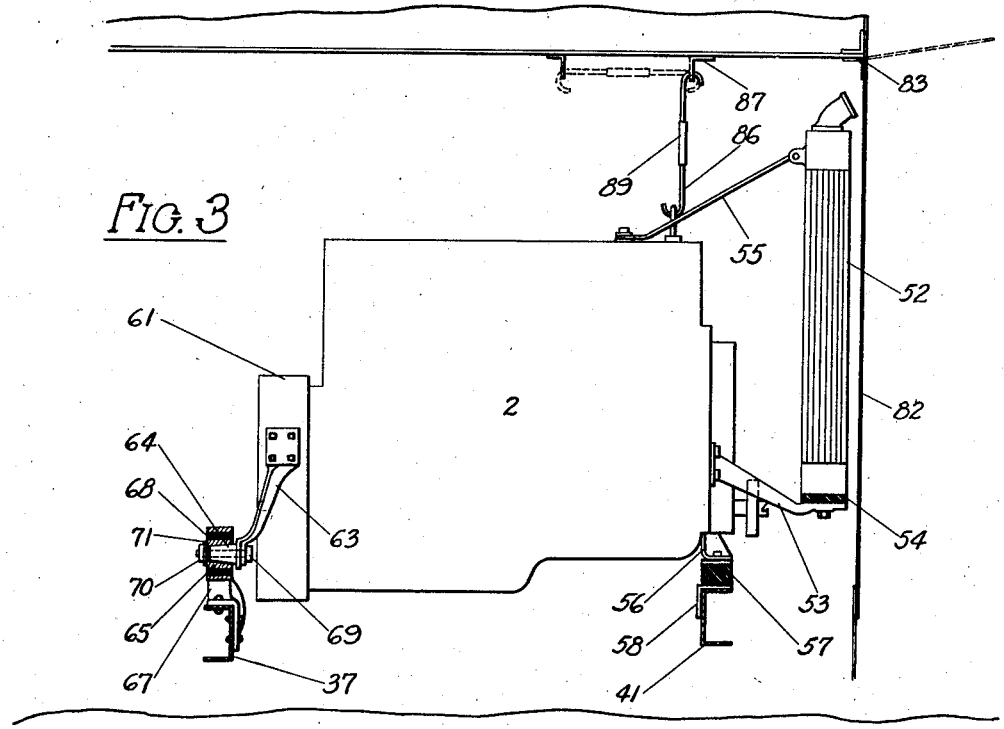
Fig. 3 is an enlarged view of the engine on the same line A—A of Fig. 1.
Figure 4:
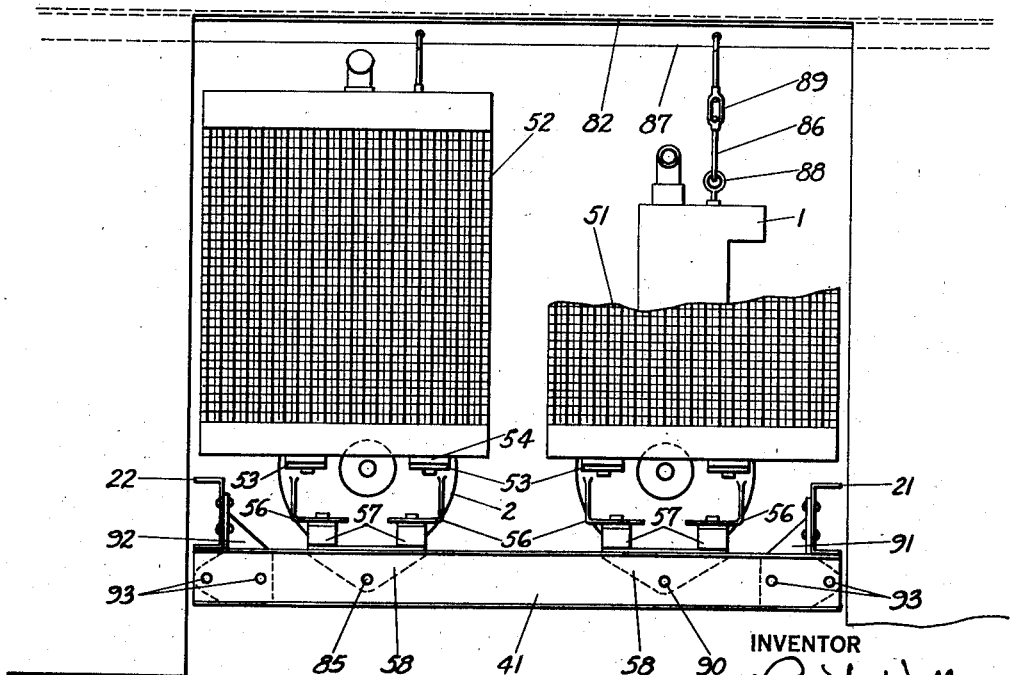
Fig. 4 is a rear view of the bus, restricted to the engine compartment.

Referring to Figs. 3, 4 and 5, it will be noted that the engines are provided with radiators 51 and 52. Brackets 53 extend from the engines to support the radiators directly. A rubber mounting 54 is used to cushion the radiator from engine vibration. A stay rod 55 braces the top of the radiator, in spaced relation from the engine. The feet 56 form a support for the engine on a detachable cross member 41 through the intermediary of the rubber mountings 57 and the brackets 58.

At the bell-housings 60 and 61 of the engines are the supporting brackets 62 and 63. They terminate in the tapered portion 64 which fits into the internally tapered sleeve 65. The latter is mounted in the brackets 66 and 67 through the intermediary of the rubber sleeve 68. A bolt 69, by means of nut 70 and washer 71, draws the tapered members together and holds them in rigid relationship.

In order to remove either or both engines, I propose to use a hand truck shown in Figs. 6 and 7, which consists of the U-shaped member 70 to which are pivotally attached the legs 71 and 72. The wheels 73 are attached to the extremity of these legs and can be mounted in fixed or caster fashion as desired. The hand crank 74 is attached to the rod 75 which has a right and left hand threaded portion which passes through the cross bars 76 and 77. These cross bars are pivotally mounted in the T fittings 78 and 79. Rotation of the crank 74 will therefore raise or lower the member 70 which is so shaped as to fit the crank case lower half of the engine 2 as indicated, bearing against the underside of the flange 80.

Let us assume that we wish to remove engine 2 together with its gear box 4. As previously explained, the universal joint of the slip type is back of the gear box and the propeller shaft can be separated at the slip joint 81. The propeller shaft 7 will therefore remain in place if the shaft is "broken" and rest upon the axle housing, or a frame support can be provided ahead of the slip joint for this purpose. The rear sheathing cover 82, in Fig. 3, is swung open on the hinge 83.

In its raised position as shown by the dotted lines in Fig. 3, the power plants are now exposed from the rear. The hand truck 70 in its lowered position is run under engine 2. When in place, similar to the position indicated in Fig. 6, the member 70 is raised till it contacts with the engine flange 80. The bolts 69 of the bell-housing supports are removed as well as bolt 85 which secures bracket 58 to the cross member 41. At the same time the hook 86 which is attached to the cross angle 87 is placed through the eye bolt 88 which is permanently affixed to engine 1. A similar eye bolt is affixed to engine 2. The turnbuckle 89 is rotated in order to take the weight of the engine and relieve it from the feet 56. Bolt 90 is removed from the bracket 58 of engine 1. It is possible to slightly raise the radiator end of engine 1 without touching the bell-housing brackets 63 due to their rubber mounting 68. The flexibility of this mounting permits a slight angular tilting of the engine. The cross member 41 is normally secured to the central frame members 21 and 22 by means of the brackets 91 and 92 by means of bolts 93. Since the weight is relieved from brackets 58, it is possible to remove cross member 41 after bolts 93 have been taken out. It is now possible to pull out the left power plant as there are no obstructions in the way. Since the radiator 52 is directly mounted on engine 2, it also comes out with the engine, thereby avoiding the necessity of breaking any water hose connections.

In replacing an engine, the hand truck is wheeled back into the bus with the engine upon it. The tapered member 64 is started into the tapered hole in the sleeve 65 and the accuracy of alignment is increased until members 64 and 65 are fully in contact. The cross member 41 is put in place by means of bolts 93 and the hand truck 70 is lowered so that the engine's weight again comes upon the cross member 41 where a bolt 85 is now replaced. The hook 86 is lowered by turning the turnbuckle 89 in the proper direction. When the weight of engine 1 is fully upon cross member 41, the bolt 90 is replaced and hook 86 is swung out of the way as indicated by the dotted lines in Fig. 3. The hand truck 70 is lowered so as to pass under cross member 41 and taken out of the way.

In Fig. 8 a rigid engine mounting is shown at the bell-housings 60 and 61. These housings have the bosses 96 and 97 at the bottom and brackets 98 extend to the cross member 37. Brackets 99 and 100 secure the engines to the central frame members 21 and 22. At the center the brackets 101 and 102 bolt together and complete the rigid connection transversely across the bell-housings, thereby forming a rigid connection between the frame members 21 and 22.

Due to the removability of the engines, it is possible to transfer an engine from another bus or the operating company can keep on hand one or more spare engines which can be quickly exchanged and thereby avoid delay while making repairs to the engine. As will be seen later, it is possible to drive the bus with one engine, while the other one is removed and in the repair shop. In order to make this possible in the construction shown in Fig. 8 in which there is a dependence of one engine mounting upon the other, the spacer bar 105 shown in Fig. 9 can take the place of engine 2, assuming that same has been removed. The right end of bar 105 bolts to bracket 100 and the left end bolts to bracket 101. Should it be desired to remove engine 1, bar 105 is reversed from the position shown in Fig. 9.

The cover 82 in Fig. 3 closes off the engine compartment at the rear. However, it is provided with a screened opening immediately behind the two radiator cores in order to allow exit of the cooling air currents.

Referring to Fig. 10, the sloping central frame member 22 is shown together with the outside frame member 26. The latter is shown in one piece, extending from front to back, instead of being broken for the wheel housings. This construction is possible if the width is sufficiently great to come outside of the tire limits. The cross members 31, 32, 33, 34 and 37 are secured directly to the bottom flange of central member 22 by giving the upper flange of the cross members a slight incline to conform with that of member 22, or a wedge-shaped member can be inserted between them so that the webs of the cross members are in a truly vertical position and the flanges in a horizontal one. The side posts 110, 111, 112, 113, 114 and 115 are indicated in Fig. 10 by dotted lines in order not to obscure the structure behind them. If the front corners of the bus body are not rounded, the cross member 31 will extend completely across the front and as indicated in Fig. 11 the outside member 26 is directly secured to same. The post 110 rests on the member 26 which is in the form of a Z bar, being secured between the plates 116 and 117 which extend inward and anchor to the cross member 31. For clarity, the plate 117 is not shown in Fig. 11. It will be noted that the flooring 23 extends to the post 110 and is supported thereby through the angle 118. In Fig. 12 there is a space between cross member 34 and outside member 26. Connection between them is made by means of the plates 120 and 121, a spacer tube 122 extending between said plates and around bolt 123. When the space is still greater as at cross member 37 in Fig. 10, a spacer 124 is located between the cross member and the outside member 26 to impart rigidity and stability to the plates 125 and 126. In the event that it is desirable to place a post where no cross member is located, the plates 127 and 128 in Fig. 13 are used. It will be noted that in all the plates mentioned other than 116 and 117, a flange is provided to secure the plates to both the top and bottom flanges of the outside member 26. While wooden posts are shown in the drawings, the same principle can be employed with steel posts, in which case the plates can form an integral part of the posts. Where the cross members are at a distance below the central frame members, as in the case of cross members 35 and 36 in Fig. 10, they are connected to the central member 22 by means of the plates 129 and 130.

Fig. 14 is a horizontal section of the transfer case 8. The shaft 135 receives power from the propeller shaft 6. Shaft 136 does likewise from propeller shaft 7. Shaft 137 delivers power to the propeller shaft 9 which is connected to the driving axle 5. On these shafts are respectively mounted the herringbone gears 138, 139 and 140. The shafts are mounted on anti-friction bearings as customarily used. The gear 138 is loosely mounted on shaft 135 and the clutch member 141 is mounted on a splined portion of shaft 135. The clutch member 141 has external teeth which fit into internal teeth in the gear 138 and when these teeth interlock, as shown in Fig. 14, gear 138 is clutched to shaft 135. Shaft 135 extends through the transfer case and is provided with a flange 142 which is used to drive the generator 15 and compressor 16. Control of the clutch member 141 is maintained by the shifting yoke 143 on the shifter bar 144. Shaft 136 also extends through the case and the disc 145 is mounted thereupon, forming the rotating member of the conventionally used disc brake.

Referring to Fig. 15, the gear shift lever 150 actuates the tube 151 and imparts thereto a rotational as well as fore-and-aft movement. Fig. 16 is a front view of the shifting lever 150 and Fig. 17 is a side view thereof. The lever 150 is universally mounted on its base by means of the ball 152 and socket 153. To the forward end of tube 151 is secured the lever 154 which terminates in the ball 155. The latter is held between the sockets 156 and 157. These sockets fit into the enlarged portion of lever 150, and socket 157 is provided with a screw thread in order to take out any play between the ball and sockets. A bracket 158 supports the forward end of tube 151.

Swinging the lever 150 in the plane of the paper, in Fig. 16, which corresponds to a transverse movement of the lever as in the case of selecting the proper gear box shifter bar when selecting gears, results in a rotational movement of tube 151 directionally opposite that of lever 150 around its fulcrum 152 due to the location of the ball 155 below the center of tube 151. Movement of the lever 150 in the plane of the paper, in Fig. 17, which corresponds to a fore-and-aft movement, results in a fore-and-aft movement of tube 151 in the same direction as the lever 150.

At the rear end of tube 151, the lever 160 is affixed. The latter houses a pair of ball sockets similar to lever 150, which encompass the ball 161 on the end of lever 162, as shown in Figs. 18 and 19. In the latter view, it will be seen that lever 162 is secured to one end of shaft 163. The lever 164 is attached to shaft 163 within the control-head 165 by gear box 4. Within same are located the conventional shifter bars 166, 167 and 168. If the shaft 163 be shifted sideways or in the plane of the paper, the selecting lever 164 would pick up one of the shifter bars 166, 167 or 168, depending upon its position. When in a position to line up with one of these bars, rotational movement of shaft 163 would move the shifter bar it is engaged with.

It will be noted that a fore-and-aft movement of lever 150 in Fig. 17 causes a fore-and-aft movement of tube 151. The lever 160 at the rear end of same causes rotational movement of shaft 163 due to the motion imparted to ball 161. If lever 150 in Fig. 17 is given a movement corresponding to a clockwise direction, the tube 151 is pushed to the right, corresponding to the rear of the car, and shaft 163 in Fig. 18 is imparted a movement in a counter-clockwise direction. If lever 150 is given a clockwise movement, tube 151 is imparted a counter-clockwise movement. As viewed in Fig. 19, shaft 163 is moved to the left. In this way both movements, transverse and longitudinal, of lever 150 are changed over to the opposite directions at the control-head 165. This reversal of movement is done in order that the same direction for shifting be imparted to lever 150 as is done in conventional practice, even though the gear box 4 is swung around in the opposite direction from conventional practice. The actual selecting of the shifter bars and actuating them is according to the customary mode, the only difference being that the directions be reversed in order that the standard gear shift positions be maintained.

Shaft 163 is connected to shaft 170 which enters the control-head 171 of gear box 3, in Fig. 15. Both gear boxes are actuated by shafts 163 and 170, the intermediate shaft 172 being provided with flanges mating with similar flanges on shafts 163 and 170. The intermediate shaft 172 is merely provided so that in the case of removal of one engine, a break can be made in this control mechanism. To all intent shafts 163, 170 and 172 act as a single unit except when removing one power plant. The flanges can be provided with mating holes so that they cannot be connected up wrongly.

Referring to Fig. 20 which is an enlarged view of the lower portion of selecting lever 164, it will be noted that the actual engaging member 175 is provided with a cylindrical shank 176 which fits into a hole within the lever 164. The pin 177 extends through shank 176 and works vertically within the slots 178. Surrounding shaft 163 is the tube 180 in Fig. 19. At its left hand is affixed the cam plate 181 shown in Fig. 21. It is provided with the cam slot 182 in which slides the roller 183. Through the latter extends pin 177 as shown in Fig. 20. It will be noted in Fig. 21 that the cam slot 182 consists of three sections, two of which are concentric with tube 180 but at different radii. These concentric portions are then connected by an easy curve forming the third or intermediate section. When the cam 181 is in the position shown in Fig. 21 and held stationary, the actuating member 175 engages with the shifter bar 168 and movement of the latter is normal. The extent of the slot is such that the roller 183 can move therein and there is no relative motion between lever 164 and the actuating member 175. To all intent it acts as a solid member.

In order to adapt the power requirements to a light load, it is desirable to cut-out one engine and thereby obtain maximum economy which is impossible when a large engine is throttled down and operates at its point of minimum fuel efficiency. As previously explained, this is desirable in city service where load fluctuations vary during the periods of the day. In order to accomplish this, my design has been laid out so that engine 2 can cease to function. In order to do this, I have made provision so that under such conditions the gear box 4 becomes inoperative by maintaining it in the neutral position. Due to the gear actions in the transfer case 8, the propeller shaft 7 will be rotated and also the main shaft of the gear box 4. I have provided a means whereby no accidental engagement of the gears can happen. To accomplish this the horizontal lever 190, in Figs. 15 and 26, actuates the rod 191 through the intermediary of bell crank 192. The rear end of rod 191 is connected to lever 193. The latter is mounted on tube 180 through a spline fit as shown in Fig. 22. A strap 194 holds lever 193 against the control-head 165 but does not prevent oscillation of same. In this way shaft 163 can be given endwise movement and not be hindered by lever 193. Tube 180 is loosely mounted on shaft 163 and rotational movement of one exerts no influence on the other. Should it be desired to make gear box 4 inactive, lever 190 is depressed to desired position shown in Fig. 26 whereby cam 181 is swung to the position shown in the dotted lines. This movement causes roller 183 and pin 177 to rise in the hole in lever 164. This movement raises the actuating member 175 so that it is clear of the shifting bars. When in this elevated position, any rotational or side movement of shaft 163 prevents actuation of the shifter bars and the result would be the same as if lever 164 and operating head 175 were entirely eliminated.

In order to prevent any damage to the gears in gear box 4, it is desirable that the shifting mechanism in control-head 165 be removed from, or put into, action only at a time when the gears are in a neutral position; otherwise an operator might be proceeding with the vehicle and when in gear on any speed, he might attempt to throw gear box 4 out of action. It would then be questionable whether the particular gear be properly reengaged. In order to prevent any possibility of such derangement, an interlocking mechanism is provided so that the control rod 191 can only be moved when the gear shifting tube 151 is in the neutral position, fore-and-aft. In other words, the shifter bars 166, 167 and 168 must be in the neutral position before lever 193, and with it cam 181, can be actuated. For this purpose the interlocking mechanism 200 is placed anywhere between the operating levers 150 and 190 and the levers 162 and 193. Referring to Fig. 23, it will be noted that the gear shifting tube 151 and the cam control rod 191 pass through the body 200. Tube 151 is provided with a notch 201. This notch aligns itself with hole 202 when the tube 151 is in the fore-and-aft neutral position. The notch 201 being circular, there is no restriction to any rotational movement of tube 151, in case the plunger 203, which is located in hole 202, should enter the notch 201. The plunger 203 can also enter either notch 204 or notch 205 on an enlarged portion of rod 191. The length of the plunger 203 is equal to the distance between tube 151 and rod 191, plus the depth of the notch on either, both notches being of the same depth. In this way when the notches 201 and 204 are in alignment as shown in Fig. 23, either member 151 or 191 can be moved and the other one is locked stationary. In the position shown the gears in gear box 4 are in the neutral position and since rod 191 is in its forward position, the operating head 175 is out of action. Any shifting of the gears in gear box 4, which is accompanied by a movement of tube 151, locks rod 191 and cam 181 in position. Presuming that the vehicle is in operation with gear box 4 out of action and it is desired to return it to action, rod 151 is placed in the neutral position as indicated in Fig. 23. Rod 191 is moved back or to the right and when cam 181 is swung to the position shown in Fig. 21, notch 205 is in alignment with plunger 203. Any shifting of gears now locks cam 181 in position and the operating head 175 is again effective. In this way head 175 can rise away from, or enter into engagement with, the shifter bars only when said bars are in the neutral position. The interlocking mechanism insures the proper operation of either levers 150 or 190 with the other one in its proper position and no dependence is placed upon the human element.

Referring to Fig. 15, other controls consist of the brake pedal 208 which operates the conventional valve 209 of the air brake system. Clutch pedal 210, also shown in Fig. 24, actuates the cross shaft 211 by means of rod 212 and lever 213. Rod 214 continues to the rear or right and operates clutch shaft 215 by means of lever 216. Clutch shaft 217 is actuated by rod 218 through the floating lever 219 and the fixed lever 200, see Fig. 25. Lever 219 is free on shaft 217, whereas lever 220 is keyed thereto. An adjusting screw 221 is provided on lever 219 in order to make possible close adjustment of the clutch ahead of gear box 3. Since the one pedal actuates both clutches, a fine adjustment is necessary in order that both clutches engage at the same time. I prefer to use the cross shaft 211 and rods 214 and 218 as it is only necessary to remove a clevis pin from either lever 216 or 219, depending upon which power plant is being removed. The pull of the rods is such that the proper directional rotation be imparted to clutch shafts 215 and 217, in spite of the power plant being in the reversed position.

It will be recalled, referring to Figs. 1 and 14, that the generator 15 and air compressor 16 are driven by shaft 135, to which the propeller shaft 6 is attached at its rear. The gears in Fig. 14 are shown as of the same diameter so that the power driven accessories rotate at the same speed as any of the propeller shafts 6, 7 and 9. It is of course possible to make gears 138 and 140 either smaller or larger than gear 139, depending upon how the overall gear ratios might be sub-divided between the engines and the rear wheels. Were the power driven accessories to be actuated only when the vehicle moves, a vehicle might start out in the morning without any air supply for the braking system, for instance, and no air could be obtained unless the vehicle was put in motion. It is a well-known fact that most of the air can leak out during an interval of rest, such as over night, and it would be precarious to attempt to move a vehicle without an air supply sufficient to brake it. For this reason the clutch 141 is provided, so that when it is shifted to the left in Fig. 14, gear 138 is freed from shaft 135 and engine 1 can drive the accessories without motion being imparted to the vehicle. While electrical energy is not lost during an idle period, similar to compressed air, the generator 15 is driven at the same time as compressor 16. Should the batteries need no charge, the automatic control relieves the generator 15 and it serves as a connecting member between shaft 135 and the compressor 16.

The clutch control rod 144 in Figs. 14 and 15 is actuated by means of the horizontal bell-crank lever 225 whose fulcrum is at the hub 226. Rod 227 connects lever 225 with the shifter bar 144. To actuate the power driven accessories, it is necessary to drive through the gear box 3. If gear box 4 is not made inoperative, it might be possible to actuate the vehicle by driving with engine 2. While this is possible, it would prevent the operator from fixing his attention on the proper driving of the vehicle. It is therefore desirable that gear box 4 be made inoperative through cam 181 and this is obtained by an interlocking mechanism consisting of rod 230 in Fig. 15, which projects through the guide 231 and butts against the boss 232 on lever 190, as indicated in Fig. 26. In this figure the cam 181, in full lines, allows operation of the gear box 4. In this position it is impossible to move the clutch shifter bar 144 by means of lever 225, due to the blocking of rod 230 by the boss 232 and lever 190. Therefore, in order to drive the accessories without moving the vehicle, lever 190 must be shifted to the position shown by the dotted lines in Fig. 26 in order that rod 230 be not obstructed. When lever 190 is in the dotted position, the cam 181 has raised the operating head 175 so as to make gear box 4 inoperative. If desired, a further precaution can be added in the form of the switch 235 in Figs. 27 and 28. The link 236 connects lever 225 with the plunger 237. Insulated therefrom and mounted at the top thereof is the copper disc 238. When the lever 225 is in the normal vehicle-running position, the disc 238 establishes contact between fingers 239 and 240. As indicated in Fig. 27, switch 235 is in series with the ignition switch 245 which also controls current from battery 246 to the coil 247 and distributor 248. This system controls the ignition for engine 2. It will be seen that when lever 225 is actuated to move bar 144 in Fig. 15 to the left in order to disengage clutch 141, contact is broken in switch 235 and therefore engine 2 cannot be operated.

Another control member is the hand brake lever 250 which actuates brake-shoes against disc 145 through the rod 251. The throttle control rod 255 is actuated by the accelerator pedal 256. A two-piece cross shaft 258—259 is actuated by rod 255 through lever 260. Levers 261 and 262 operate on the carburetors 263 and 264. The intermediate coupling 265 unites shafts 258 and 259 and allows their separation when removing one engine or the other.

Fig. 29 is a rear view of the bus showing engine 1 and radiator 51 in their proper relationship. The radiator fan 271 is driven by belt 273 in the customary manner. The exhaust manifold 275 is connected to the vertical exhaust pipe 277. The upper portion of this member forms the muffler 279. This is shown as being of the sound-absorbing type in which the central pipe is perforated and a mineral wool jacket extends around same and the outside shell. From the top of the engine compartment extends a flue 280 which is concentric with muffler 279, forming an air jacket therebetween. The upper end of the muffler is so located as to form an ejector effect, thereby drawing in heated air from the top of the engine compartment and discharging it together with the exhaust gases through the outlet 281. This method is provided so that any stagnant air in the upper portion of the engine compartment be removed. The ejector effect of the muffler can also be utilized to ventilate the upper portion of the body. For this purpose a door 282 is located at the upper part of flue 280 which when opened allows the air within the body to pass into the flue 280 for ejection.

Referring to Figs. 30 and 31, it will be noted that the radiators 51 and 52 project further toward the side of the vehicle than to the center. The purpose is to allow cooling of a portion of the core by the air stream from the sides which follows the streamline formation of the rear of the body as will be presently explained. Fig. 31 which is a sectional view on lines C—C of Fig. 30, shows the side openings 285 and 286. These openings are to the rear of seat 287 and the openings can be ornamented by a screen or the vertical vanes shown. Within the body proper are the partition walls 289 and 290. The center portion of the cores of radiators 51 and 52 receive an air blast from the fans 271 and 272. The remaining portions of the cores receive the air draft coming through the side openings 285 and 286. The partition walls 289 and 290 give a streamline form and the outside air will follow these walls as indicated by the arrows, due to the forward motion of the vehicle. In order to give an easy flow to the side air currents, the walls 291 and 292 are fitted inside of the curved rear corners of the body. A Venturi effect is thus obtained and the air flow is smoother and less turbulent than would otherwise be the case.

In Fig. 32 the upper arrows indicate the air flow lines over the body. The forward upper portion 300 of same, where the windshield is located, slopes back at an angle and a large curve rounds off the top corner. A similar effect is incorporated at the rear in which the sloping portion 301 induces the air to flow freely instead of creating a violent vacuum that accompanies the ordinary straight back end. By relieving the vacuum by this downflow at the rear in Fig. 32 and also allowing side flow as in Fig. 31, the vacuum effect at the rear of the body is concentrated over the projected areas of the radiators 51 and 52. In this way the vacuum effect behind the vehicle plays an important part in the cooling system. Rear mounted radiators have suffered from lack of easy air flow and my invention consists in streamlining the body so as to prevent vacuum formation except directly at the radiators, so that both the cooling fans and the vacuum effect cause ample air flow through the radiators. If it be desired to supply more air to the fans and radiators, a deflector 302 can be placed near the rear of the body as shown. In this way air lying near the surface of the ground will be scooped up to the radiators.

In Fig. 33 the partition walls 289 and 290 extend across the front of the cylinder block and to the inner edge of the cooling fan as indicated. In this way the side air currents supply air directly to the fans which in turn force it through the radiators.

In Fig. 34 the radiators 51 and 52 are located at the side of the vehicle body. There is a recessed portion 305 and 306 extending the height of the radiators. The partition walls 289 and 290 extend from the front of the radiator cores, across the front of the cylinder blocks, so as to convey air passing through the radiators to the cooling fans 271 and 272. The streamline effect produced by the partition walls 289 and 290 induces the side air currents to enter the radiators as indicated by the arrows and the fans 271 and 272 augment this effect as well as discharging the air directly out of the rear of the body. The purpose for the recesses 305 and 306 is to enable deflector vanes 308 and 309 to be in their wide open position as indicated in Fig. 34 without projecting beyond the extreme width of the body. These vanes when in their wide open position are in an angular position as shown and can be swung, as indicated by the arcs in the drawings, so as to prevent air flow through the radiator by covering the core. Their movement can be manually controlled or under the influence of a thermostat subject to either the heat of the cooling water or of the air in the engine compartment. A series of vanes are shown, each one in front being smaller than the one to the rear. The purpose of this is to insure a scoop effect from each of the vanes and so that a forward one will not entirely obstruct the one to the rear.

A roof mounting of the radiators is indicated in Fig. 35. The water outlet pipe 312 and the return pipe 313 are in communication with the radiator 314 located on the roof of the body and within the scoop 315. This scoop is very effective due to the slope of the wind-shield portion 300 of the body, resulting in a considerable flow of air through the radiator 314. The scoop 315 stops a short distance behind the radiator. A coil of pipe 316 extends between the water outlet and return pipes 312 and 313 respectively and controls a circulation through radiator 314 which is established or prevented by means of valves 317 and 318. The latter can be thermostatically controlled by the temperature within the body.

A means of supplying a considerable quantity of air to the fan and radiator would be that a rear scoop 320 be provided as shown in Fig. 36. The space between the scoop 320 and the body exterior forms a duct leading to fan 272 and radiator 52. Glass windows 321 and 322 are located at the back of the body and the scoop 320 in order that vision might be obtained therethrough. To prevent same becoming obstructed during rain or snow, the windshield wipers 323 and 324 are provided on the duct side of the windows. At the bottom the duct is completed by the deflector 325.

In Fig. 37 the rear scoop 320 encloses the roof radiator 330 and the air is discharged at the rear of the body to help reduce the vacuum effect when the vehicle is in motion.

In Fig. 38 the rear scoop encompasses the roof radiator 330 and the discharge 281 of the exhaust gases also forms an ejector at the rear portion of the roof duct, thus inducing a greater flow of air through the duct.

Fig. 39 shows a combination of front and rear roof scoops 315 and 320 with the roof radiators 314 and 330. Fig. 40 is a section of the roof ducts 315 and 320 in which they extend across the entire roof, being rounded off at the sides to blend into the body. The opening 331 allows discharge of air from the front duct, the deflector 332 extending upward a sufficient distance to the rear of the opening. In order to preserve the appearance of the body, the intermediate portion thereof is provided with the vertical portions 335 and 336 as shown in Fig. 41.

There are a number of variations of the rear mounting of the engines, whereby it is possible to convert the vehicle to a four-wheel drive type or to make certain minor detailed changes as will be explained. In Fig. 42 the power plants, driving mechanisms, transfer case and rear axle are the same as shown in Fig. 1. However, a front propeller shaft 350 extends from the transfer case in order to drive the front axle 351. The brake disc 145 is here shown on the central shaft of the transfer case. A shifter rod 352 and 353 is provided at each side so that the drive from propeller shaft 350 can be disconnected from either of the propeller shafts 6 or 7 by means of clutch members similar to member 143 in Fig. 14.

If it be desired to transmit power to the front driving axle only, the arrangement shown in Fig. 43 is utilized. This construction corresponds with that shown on Fig. 42, with the omission of the propeller shaft 9 since there is no rear drive. It will be noted that engines 1 and 2 are in alignment with propeller shafts 6 and 7, thereby relieving the forward universal joints of any angularity, in the horizontal plane. In all previous examples showing engines 1 and 2 their center distance is greater than the center distance of shafts 135 and 136 in Fig. 14. The propeller shafts 6 and 7 take care of the variations in center distance between the transfer case shaft and the power plant shafts.

Transmitting the power of one engine to the rear axle is possible by means of the construction shown in Fig. 44 in which the engine 2 and gear box 4 deliver power through propeller shaft 7 to transfer case 358. The propeller shaft 9 conveys the power back to the axle 359. While the figure shows the propeller shafts 7 and 9 offset in a horizontal plane, it is perfectly feasible to place the engine 2 in a central location and the propeller shaft 7 would be above the shaft 9.

A different disposition of the power transmitting units is shown in Fig. 45 in which the clutches instead of being at the forward end of the gear box housings, are mounted in independent clutch housings 361 and 362 and power is conveyed therefrom by means of propeller shafts 363 and 364 to the gear boxes 365 and 366. The generator 15 and air compressor 16 are driven from the forward end of gear box 365 by means of gearing or chain and sprockets within the case 370.

Another distribution of the power transmission units is shown in Fig. 46 in which the clutch housings 361 and 362 are placed at the rear end of the gear boxes 365 and 366.

In Fig. 47 engines 1 and 2 transmit their power directly to transfer case 8 through the propeller shafts 373 and 374. The generator 15 is driven by one of the transfer case shafts and compressor 16 by the other. A single clutch within the housing 375 transmits power to the gear box 376. The propeller shaft 9 conveys power therefrom to the rear axle 5.

In Fig. 48 engines 1 and 2 are directly connected to the transfer case 378 which consists of three gears in order that the direction of rotation of each engine be the same, or two sprockets are used with a chain therebetween. The single propeller shaft 379 conveys power to the housing 380. The transmission mechanism within same conveys power to the clutch within the housing 375 behind which is located gear box 376.

A four-wheel drive layout is shown in Fig. 49 in which engine 1 transmits power to the rear axle 5 and engine 2 to the front axle 351. Propeller shaft 381 conveys power to the transfer case 382. Propeller shaft 9 transmits power therefrom to rear axle 5. Engine 2 transmits power through propeller shafts 385 and 386 to the front axle 351. Two brake discs 387 and 388 are located ahead of gear boxes 3 and 4.

In Fig. 50 engines 1 and 2 transmit power through propeller shafts 391 and 392 to the transfer cases 382 and 383. The drive to the axle 395 is through propeller shafts 396 and 397. Axle 395 is provided with two housings in which the final gearing is located, one set of gearing being used to drive each wheel. This is similar to the well-known construction used in most of the present-day gasoline-electric driven busses.

In Fig. 51 engines 1 and 2 are not in a reversed position but face forward with the radiators 51 and 52 in front of them. The transfer case 8 is located at the rear of the gear boxes 3 and 4 and the propeller shaft 9 conveys the power to the rear axle 5. The partition walls 289 and 290 provide for the entrance of side air currents to the forward side of the radiators. The partition walls or deflectors 401 and 402 direct the flow so that it will be concentrated on the radiators 51 and 52. The exit air escapes through a screened opening 403 at the rear of the bus.

While a worm drive type of axle has been indicated in Figs. 1 and 2, my invention is not restricted to the use thereof but is applicable to any type of axle such as bevel-gear or double reduction. A special type of axle is shown in Fig. 52 in which the center member 405 houses the gears 406 and 407. These gears can be made so as to give only a small speed reduction in order that the bowl or center housing 408 be kept to a small size in order to gain ground clearance.

The housing 405 terminates at the side with a flange 410 to which is secured the housing 411. Within this housing are located the gear 412 on the axle shaft 413 and the gear 414 on the wheel shaft 415. Gears 412 and 414 can provide the necessary reduction ratio and because of their vertically offset relationship, the engines can be lowered to give a lower center of gravity in the vehicle. This is possible due to the fact that the housing 405 is in a relatively lower position and the propeller shafts 6 and 7 in their lowered position will have sufficient clearance above it.

Various phases of my invention can also be applied to multiple engines located at the front of the vehicle. In Fig. 53 engines 421 and 422 are placed ahead of the front axle 425 and transmit power through propeller shafts 426 and 427 to the transfer case 428. To the rear of same is located the clutch housing 431 and the gear box 432. Propeller shaft 429 transmits power to the rear axle 5.

In Fig. 54 which is a side elevation of the power plant shown in Fig. 53, it will be noted that the front axle 425 can be brought in close relationship with the engine 422, just clearing the bell-housing 434. The universal joint 435 at the forward end of propeller shaft 427 is secured directly to the fly-wheel of engine 422.

In Fig. 55 the clutch housings 438 and 439 are directly mounted on engines 421 and 422 while the transfer case 428 is immediately ahead of the gear box 432.

In Fig. 56 the power plants 421 and 422 transmit power to the centrally located transfer case 8, with propeller shaft 429 driving the gear axle 5 and propeller shaft 441 driving the front axle 351. The transfer case 8 is of the same construction shown in Fig. 14 with three gears. Due to the indirect drive through one set of gearing, the direction of rotation of the engine is reversed so that propeller shaft 429 rotates in an opposite direction. If a bevel-gear construction be used as indicated in the drawings, the bevel-ring gear is on the right side of the axle center and this also applies to Figs. 53 and 55. In the construction shown in Fig. 1 and Fig. 14, while the power goes through one set of gearing for each engine, the direction of rotation of the driving axle pinion shaft remains the same as with the conventional axle. Due to the reversed position of the engines in Fig. 1, the direction of rotation of the propeller shaft 9 is clockwise as viewed from the front of the vehicle, since the directions of rotation of the engines are counter-clockwise as viewed from the front of the vehicle. The engines are conventional in that their direction of rotation is clockwise as viewed from the radiator end thereof.

In the arrangement shown in Fig. 57, the power from the engines 421 and 422 is conveyed to the transfer case 428 and gear box 432. Propeller shaft 429 transmits power to the driving axle 5. The generator 15 and air compressor 16 are driven from the transfer case 428.

Immediately behind, the unit clutch housing 445 is attached to the engines 421 and 422 in Fig. 58. The unit bell-housing 446 connects the two engines. The transfer case 448 unites the power of the two engines and transmits it to gear box 432 through propeller shaft 449. Propeller shaft 429 conveys the power to the driving axle 5. The power driven accessories 15 and 16 are driven by an extension shaft from case 448.

Referring to Figs. 59 and 60, the engine blocks are secured to the unit bell-housing 446. This construction provides a single mounting means for the power plants, by means of feet 451 and 452 on the bell-housing 446. In order to provide accessibility to the values and adjustments of engine 422, the engine 421 is provided with the flange 453 which has a circular pilot 454 which fits into a circle opening at the forward end of bell-housing 446. By removing the bolts holding engine 421 to the bell-housing 446, it is possible to swing engine 421 outwardly away from engine 422 as indicated in Fig. 59. This gives complete access to the inner side of engine 422. It is understood that whatever engine mounted accessories are required, are placed on the outside of each engine where they will be readily accessible. This leaves principally the valve adjustments of engine 422 somewhat inaccessible and being able to pivotally rotate engine 421 as described, gives access thereto. While engines can be built so that the valves are on the outside of each, it is desirable to use standard engines without resorting to symmetrically right and left constructions. Both engines 421 and 422 can be pivotally mounted in the bell-housing 446 if desired, although it is not essential that both engines be rotatable.

It is not necessary to maintain the vertical relationship of the two engines as shown in Fig. 59. They can be assembled to the bell-housing 446 with inclined axes as shown in Fig. 61. This will give greater access to the space between the engines. The constructions shown in Figs. 59 and 61 make is possible to utilize engines that are standard in every respect and by removing their bell-housings and substituting a unit housing, to provide a compact power plant. The slight tilting of the engines shown in Fig. 61 is not sufficient to disturb anything, such as the lubricating system. If it be desired to provide a considerable angle, naturally certain parts must be slightly modified to insure proper operation. In any event the intake manifold flanges would naturally be machined at such an angle that the carbureters would remain vertical. The forward end of the engines are provided with the supports 458 and 459. This is the customary front support which is concentric with the crank shaft. The forward end of the engines are supported by the cross member 460. A boss 461 is provided in member 460 to act as a front support for the entire engine unit. A three-point support is thus provided by means of mounting points 451, 452 and 461.

In Fig. 63 engines 421 and 422 are united by the bell-housing 446 and the propeller shafts 426 and 427 convey power to the clutch housings 465 and 466. Immediately behind them are the gear boxes 467 and 468. A transfer case 469 conveys a drive to propeller shaft 441 which in turn transmits power to the front axle 351. Propeller shaft 429 conveys power to the rear axle 5. Two independent brake discs 471 and 145 are utilized.

It is possible to utilize various phases of my invention for centrally-located power plants. In Fig. 64 engines 481 and 482 transmit power through the gear boxes 483 and 484 to the rear axle 486 and the front axle 487 through the propeller shafts 488 and 489 respectively. The various control and interlocking arrangements are applicable to this construction.

In Fig. 65 engines 481 and 482, together with gear boxes 483 and 484, convey power to the transfer case 491. Since gears 492 and 493 mate together, conventional engines can be used rotating in the same direction. The reversed positions of the engines as shown in the drawings permit this. The final gear 494 conveys power to the propeller shafts 488 and 489. This makes an offset drive for the vehicle. A central disposition of the driving pinions on the axles and a symmetrical positioning of the engines is possible by dropping gear 494 beneath gear 491 so that it will just clear gear 492, as indicated in Fig. 66.

In Fig. 67 the engine 501 is located centrally across the vehicle and between the front axle 351 and the rear axle 5. This engine is of the horizontal opposed type, having cylinder blocks 502 and 503. Each end of the crank shaft is provided for a clutch mounting and has the bell-housings 505 and 506 to which are attached the gear boxes 483 and 484. Power is then conveyed to the rear axle 5 and the front axle 351 through propeller shafts 488 and 489 respectively. In the case of trucks in which the loading platform is higher than the top of the wheels, there is considerable waste space below the platform and there is ample space for a power plant. This space is utilized to the greatest advantage by means of a horizontal engine.

In Fig. 68 two engines 510 and 511 replace the single engine 501 of Fig. 67. They are also indicated as being of the horizontal opposed type. Should it be desirable to unite the drive of engines 510 and 511, a clutch 512 can be provided to connect the adjacent crank shaft ends.

In Fig. 69 the engines 481 and 482 are located between the axles and their axes are parallel to the axles. The rear propeller shaft 488 and front propeller shaft 489 are driven by bevel-gearing within the housings 515 and 516.

In Fig. 70 the engines 481 and 482 are similarly located as those in Fig. 69. They are, however, provided with the separate clutch housings 518 and 519. Between the axles and the bevel-gear housings 515 and 516 are located the gear boxes 521 and 522.

In Fig. 71 the engines 481 and 482 drive the bevel-gears within the housings 515 and 516 at the same side of the vehicle. In this case the housings 515 and 516 are compartments within the unit casting 525 which is secured to the faces of gear boxes 483 and 484.

In order to make a more compact unit and to eliminate the considerable offset of the propeller shaft from the center of the vehicle, the construction shown in Fig. 72 can be utilized. The engine 531 has the bell-housing 532 and the gear box 534 is located on the other side of the propeller shaft 488. Power is conveyed from the clutch to the shaft 538 at the end of which is located the constant mesh pinion 539. This drives the constant mesh gear 540 on countershaft 541. The sliding gears are located on the sleeve 544 which is concentric with shaft 538. Bevel-gears 550 and 551 complete the drive. In the event that it is desired to drive to a forward propeller shaft 489, gears 550 and 551 would necessarily be of the hypoid type in order that the shafts clear each other.

Certain phases of my invention are applicable to four-wheel drive vehicles and in Fig. 73 engines 421 and 422 are mounted on the unit bell-housing 446. The gear boxes 423 and 424 convey power to the transfer case 6. The front axle 351 is driven by the propeller shaft 441 and the rear axle 5 by shaft 429.

In Fig. 74 the engines 421 and 422 transmit power to the transfer cases 560 and 561. The transmitting mechanism in cases 560 and 561 convey power to the forward propeller shafts 561 and 562 which in turn transmit power to the gearing on each side of front axle 565. The propeller shafts 568 and 569 convey power to the two sets of gearing on each side of rear axle 570. Under this construction each engine drives the wheels on its side of the vehicle. Within the gears 572 and 573 are lockable differential units which are controlled by the shifter bars 574 and 575. The gearing in each axle at each side drives its own wheel. This double bowl construction of the two axles is such that the axles can be identical except for their outer ends. The front axle and rear axle are identical up to the end flanges 580.

In Fig. 75 the engine 588 and gear box 589 drive the propeller shafts through the transfer case 591. In the construction shown sprockets 592 and 593 are mounted on the transmission tail shaft but with a lockable differential unit between them. Chains are used to convey power from sprockets 592 and 593 to sprockets 594 and 595. The differential unit can be locked by the shifter bar 598, this differential unit distributing the power between the drive at each side of the vehicle. The shifter bars 574 and 575 control differential units on which gears 594 and 595 are mounted.

These control the distribution of power between the forward and rear wheels at each side.

In the case of front-located power plants, the control mechanism shown in Fig. 76 can be used. The shifting lever 601 is mounted directly over the control-head 602 and on shaft 603. Within the lever 601 which is tubular, is the rod 604. The latter in the customary way can pick up either one of the shifter bars 605, 606 and 607 which control the movement of the gears within the transmission of which 602 is the control-head. Rod 603 extends to the other control-head 612 and the lever 614 controls the shifter bars 615, 616 and 617 of the second gear box. Since lever 614 is secured to shaft 603, it moves with it and the selection and shifting of shifter bars in control-heads 602 and 612 occur simultaneously. In the event that it is desired to cut-out the engine to which the gear box is attached with control-head 602, the rod 604 can be raised by means of the collar 620 on lever 601. A pin 621 is secured in collar 620 and is movable in the slot 622 of the tubular portion of lever 601, as shown in Fig. 77. The pin 621 also passes through the upper end of rod 604. The spring 623 extends between the ball end 625 of lever 620 and the upper end of rod 604. The spring therefore normally operates the rod 604 in its downward position as shown in Fig. 76, whereby it will engage the shifter bars 605, 606 and 607, resting in the bottom of the slot 622 as shown in Fig. 77.

When collar 621 is raised so as to come to the top of notch 622, compressing spring 623 at the same time, a slight rotation is imparted to collar 620 and the pin then rests in the notch 628 of slot 622 after having traversed the horizontal portion 629. Spring 623 then retains pin 621 in notch 628, holding the lower end of rod 604 out of engagement with the shifter bars. The closure plate 631 at the base of lever 601 covers the opening 632 in the top of the control-head 602.

Fig. 78 shows a revised form of control in which the lever 635 is provided with the integral lower end 636 and is mounted on the tube 637, which slides in the control-head 602. Normally the tube 637 is united to the rod 638 which extends slightly within it as shown and a pin 640 locks the tube 637 and shaft 638 together so that side and rotational movement is conveyed to each by lever 635. The rod 638 slides within the control-head 612 in the customary manner and when pin 640 unites tube 637 and shaft 638, the pin 641 is removed. When both pins 640 and 641 are left in place as indicated in Fig. 78, the control for both gear boxes is locked. The locking effect is due to the pin 641 passing through an integral sleeve 642 in control-head 612 as well as a hole in shaft 638. When it is desired to cut-out the gear box of which 612 is the control-head, the pin 640 is removed. In this case tube 637 can move over or on shaft 638 without imparting motion thereto, due to the locking effect of pin 641. When it is desired to re-unite the control for both gear boxes, it is only necessary to re-align the holes in tube 637 in shaft 638 for the pin 640. The pin 641 is holding shaft 638 in its neutral position, thereby facilitating the operation of this alignment. While pins 640 and 641 are shown for manual operation, it will be readily seen that mechanical means can be provided to do this operation, such as providing a sleeve or supplementary element on lever 635.

In Fig. 79 the engines 651 and 652 drive the front axle 351 and rear axle 5 by means of gear boxes 653 and 654, the transfer cases 655 and 656 and the propeller shafts 657 and 658 respectively. The control lever 601 is mounted over gear box 653 and is of the tubular type shown in Fig. 76, whereby a movable inner rod is provided which can be shifted out of position so as to clear the shifter bars. It actuates the shaft 660. The end of this shaft is provided with the lever 661 which in turn encompasses the ball end of a lever 662, corresponding to lever 154 in Fig. 17. The guide 663 and tube 664 correspond to the guide 158 and tube 151 in Fig. 15. The control shaft 666 moves in the control-head 667 of gear box 654. A lever 668 at the end of shaft 666 corresponds to lever 162 in Fig. 19. The control shafts 660 and 666 thereby operate in unison and in the event that control lever 601 does not operate on the shifter bars of gear box 657, it nevertheless goes through the corresponding movement with the operating head of the inner rod 604 raised. Since shaft 666 operates in unison with shaft 660, the lever on this shaft operates on the shifter bars in gear box 654.

While the majority of examples have indicated my invention applied to a bus, it will be readily apparent that the various features of my invention are equally applicable to trucks and passenger cars. The invention may be embodied in several specific forms without departing from the spirit or essential characteristics thereof, and the present embodiment is therefore to be considered illustrative rather than restrictive, the scope of the invention being indicated by the appended claims, and all changes that come within the meaning and range of equivalency of the claims are intended to be embraced therein.

What I claim as new is:

1. A motor vehicle comprising a plurality of prime movers, a speed changing mechanism for each of said prime movers, a driving axle, a transfer case, power transmitting mechanism between said speed changing mechanisms and said transfer case, power transmitting mechanism between said transfer case and said driving axle, and means within said transfer case for making ineffective the power transmitting mechanism between one of said speed changing mechanisms and the said axle.

2. A motor vehicle comprising a plurality of engines, a plurality of gear boxes coupled thereto, a driving axle, power transmitting mechanism between said gear boxes and said axle, a control mechanism for said gear boxes, means for selectively restricting the effectiveness of said control mechanism to one of said gear boxes, means for retaining the mechanism of the other gear box in a neutral position, and means allowing action of said selectively restricting element when the control mechanism is in neutral position.

3. A motor vehicle comprising a pair of engines, a pair of gear boxes coupled thereto, a driving axle, a transfer case comprising a pair of driving shafts, propeller shafts between said gear boxes and said driving shafts, a driven shaft in said transfer case, a fixed gear on one of said driving shafts, a loose gear on the other of said driving shafts, means for coupling said loose gear to its shaft, a fixed gear on said driven shaft meshing with the driving shafts' gears, a propeller shaft between said driven shaft and said axle, a control mechanism for said gear boxes, means for selectively restricting the effectiveness of said control mechanism to one of said boxes, and means allowing the coupling of said loose gear to its shaft when the selectively restricting element is in neutral position.

4. A motor vehicle comprising a plurality of prime movers, a gear box for each of said prime movers, a shifting lever for same, a driving axle, power transmitting mechanism between said gear boxes and said axle comprising a train of gears, a case for same, means for making the gear box of one of said prime movers operative or inoperative, a control lever therefor, and an interlocking mechanism between said levers.

5. A motor vehicle comprising a plurality of prime movers, a gear box for each of said prime movers, a shifting lever for same, a driving axle, power transmitting mechanism between said gear boxes and said axle comprising a train of gears, a case for same, means for making the gear box of one of said prime movers inoperative, and mechanism requiring the other gear box to be in its neutral position at the time the said gear box is made operative.

6. A motor vehicle comprising a plurality of prime movers, a gear box for each of said prime movers, a shifting lever for same, a driving axle, power transmitting mechanism between said gear boxes and said axle comprising a train of gears, a case for same, means for making the gear box of one of said prime movers inoperative, and mechanism requiring the other gear box to be in its neutral position at the time the said gear box is made inoperative.

7. A motor vehicle comprising a driving axle, a dead axle, a plurality of prime movers located between said driving axle and the adjacent end of the vehicle, a clutch and transmission mechanism for each of said prime movers located between them and said driving axle, a transfer case located between said axles, power transmitting mechanism between said transmission mechanisms and said transfer case, and power transmitting mechanism between said transfer case and said driving axle.

8. A motor vehicle comprising a forward axle, a rear axle, a plurality of prime movers located between one of said axles and the adjacent end of the vehicle, a transfer case located between said axles, power transmitting mechanism between said prime movers and said transfer case, and power transmitting mechanism between said transfer case and said axles.

9. A motor vehicle comprising a plurality of prime movers, a driving axle, means for varying the speed ratio between said prime movers and said axle, power transmitting mechanism between said prime movers and said axle, power-driven accessories, and means for driving said accessories during movement of the vehicle by said power transmitting mechanism at a fixed ratio to the speed of the vehicle regardless of speed ratio variations between said prime movers and said axle.

10. A motor vehicle comprising a plurality of prime movers, a gear box for each of said prime movers, a driving axle, power transmitting mechanism between said gear boxes and said axle, power-driven accessories, means for driving said accessories by said power transmitting mechanism, means for making the gear box of one prime mover inoperative when the second prime mover drives said accessories, a control therefor, disconnecting means between the gear box of the second prime mover and said axle, a control therefor, and an interlocking mechanism between said controls.

11. A motor vehicle comprising a plurality of engines, a plurality of gear boxes, comprising each a shifting lever therein, shifting bars in each gear box adapted to be engaged by said levers, a driving axle, power transmitting mechanism between said gear boxes and said axle comprising a train of gears, a case for same, means making one of said levers active or inactive in its engagement with the shifting bars, and a control lever therefor.

12. A motor vehicle comprising a plurality of prime movers, a driving axle, power transmitting mechanism between said prime movers and said axle, power-driven accessories, means for driving said accessories by the power transmitting mechanism between one of said prime movers and said axle, and means for interrupting the ignition system of the second prime mover when the first prime mover drives said accessories.

13. A motor vehicle comprising a plurality of prime movers, a gear box for each of said prime movers, a shifting lever for same, a driving axle, power transmitting mechanism between said gear boxes and said axle comprising a train of gears, a case for same, means for making the gear box of one of said prime movers operative or inoperative, and a control lever therefor.

14. A motor vehicle having a control compartment in the forward end thereof and comprising a rear driving axle, a dead axle, a prime mover located between said driving axle and the adjacent rear end of the vehicle, steering mechanism in said compartment, a transfer case located between said axles, a propeller shaft with universal joints on the extremities thereof between said prime mover and said transfer case, and a propeller shaft with universal joints at the extremities thereof between said transfer case and said driving axle.

15. A motor vehicle having a control compartment in the forward end thereof and comprising a rear driving axle, a dead axle, a prime mover located between said driving axle and the adjacent rear end of the vehicle, a clutch and transmission mechanism for said prime mover located between same and said driving axle, steering mechanism in said compartment, a transfer case located between said axles, power transmitting mechanism between said transmission mechanism and said transfer case, and power transmitting mechanism between said transfer case and said driving axle.

16. A motor vehicle comprising a body, longitudinally spaced supporting axles therefor, one of which constitutes a driving axle, a plurality of prime movers and a speed change gearing coupled to each of said prime movers, located between the latter axle and the adjacent end of the vehicle body, a transfer case located between said axles, driving means connecting said transfer case with said driving axle, and power transmission means connecting each of the prime movers with said transfer case.

17. A motor vehicle comprising a plurality of prime movers, a driving axle, power transmitting mechanism between said prime movers and said axle, a power driven accessory, and means for interrupting the transmission of power from one of said prime movers to said axle and simultaneously disconnecting the other prime mover from said power transmitting mechanism, while maintaining an operative connection between the latter prime mover and said accessory.

18. A motor vehicle comprising a motor, a driving axle, power transmission mechanism including a driving shaft and a driven shaft, change speed gearing coupled to said motor, control mechanism therefor, a propeller shaft between said driven shaft and said axle, a propeller shaft between said change speed gearing and said driving shaft, a gear loose on the drive shaft and operatively connected to the driven shaft, means for coupling said loose gear to said drive shaft, and means coacting with a part of said control mechanism and connected with said coupling means to prevent coupling of said loose gear to its shaft when the control mechanism is in other than a neutral position.

19. A motor vehicle comprising a driving axle, a dead axle, a plurality of prime movers located between said driving axle and the adjacent end of the vehicle, a transfer case located between said axles, propeller shafts with flexible connections at the extremities thereof between said prime movers and said transfer case, and a propeller shaft with flexible connections at the extremities thereof between said transfer case and said driving axle.

20. A motor vehicle comprising a driving axle, a dead axle, a plurality of prime movers located between said driving axle and the adjacent end of the vehicle whose crank shaft axes are in substantially parallel relationship, a transfer case located between said axles, propeller shafts with flexible connections at the extremities thereof between said prime movers and said transfer case, and a propeller shaft with flexible connections at the extremities thereof between said transfer case and said driving axle.

21. A motor vehicle comprising a driving axle, a dead axle, a plurality of prime movers located between said driving axle and the adjacent end of the vehicle whose crank shaft axes are in substantially parallel relationship, a transfer case located between said axles, propeller shafts with flexible connections at the extremities thereof extending between said prime movers and said transfer case and the above said rear axle, and a propeller shaft with flexible connections at the extremities thereof between said transfer case and said driving axle.

22. A motor vehicle comprising a driving axle, a dead axle, a plurality of prime movers located between said driving axle and the adjacent end of the vehicle whose crank shaft axes are in substantially parallel relationship, a transfer case located between said axles, propeller shafts with flexible connections at the extremities thereof between said prime movers and said transfer case, and a centrally disposed propellor shaft with flexible connections at the extremities thereof between said transfer case and said driving axle.

23. A motor vehicle comprising a driving axle, a dead axle, a plurality of prime movers located between said driving axle and the adjacent end of the vehicle, a transfer case located between said axles comprising a plurality of driving shafts, propeller shafts with flexible connections at the extremities thereof between said prime movers and said transfer case shafts, a driven shaft in said transfer case, and a propeller shaft between said driven shaft and said driving axle.

24. A motor vehicle comprising a driving axle, a dead axle, a plurality of prime movers located between said driving axle and the adjacent end of the vehicle, a transfer case located between said axles comprising a plurality of driving shafts, gears upon said shafts, propeller shafts with flexible connections at the extremities thereof between said prime movers and said transfer case shafts, a driven shaft in said transfer case, a gear on said shaft meshing with the driving shafts' gears, and a propeller shaft with flexible connections at the extremities thereof between said driven shaft and said driving axle.

25. A motor vehicle comprising a driving axle, a dead axle, a pair of prime movers located between said driving axle and the adjacent end of the vehicle, a transfer case located between said axles comprising a pair of driving shafts, propeller shafts with flexible connections at the extremities thereof between said prime movers and said driving shafts, a driven shaft in said transfer case, a fixed gear on one of said driving shafts, a loose gear on the other of said driving shafts, means for coupling said loose gear to its shaft, a fixed gear on said driven shaft meshing with the driving shafts' gears, and a propeller shaft with flexible connections at the extremities thereof between said driven shaft and said driving axle.

26. A motor vehicle comprising a driving axle, a dead axle, a pair of prime movers located between said driving axle and the adjacent end of the vehicle, a transfer case located between said axles, comprising a pair of driving shafts, a driven shaft in said transfer case, a fixed gear on one of said driving shafts, a loose gear on the other of said driving shafts, means for coupling the loose gear to its shaft, a fixed gear on said driven shaft meshing with the driving shafts' gears, a propeller shaft between said driven shaft and said driving axle, and power driven accessories coupled to one of said driving shafts.

27. A motor vehicle comprising a driving axle, a dead axle, a pair of prime movers located between said driving axle and the adjacent end of the vehicle, a transfer case located between said axles comprising a pair of driving shafts, propeller shafts between said prime movers and said driving shafts, a driven shaft in said transfer case, a fixed gear on one of said driving shafts, a loose gear on the other of said driving shafts, means for coupling the loose gear to its shaft, a fixed gear on said driven shaft meshing with the driven shafts' gears, a propeller shaft between said driven shaft and the said driving axle, and power driven accessories coupled to the driving shaft with the loose gear.

AUSTIN M. WOLF.